US011296769B2

(12) United States Patent
Ryu et al.

(10) Patent No.: US 11,296,769 B2
(45) Date of Patent: Apr. 5, 2022

(54) USER EQUIPMENT (UE) ANTENNA GROUPING

(71) Applicant: QUALCOMM Incorporated, San Diego, CA (US)

(72) Inventors: Jung Ho Ryu, Fort Lee, NJ (US); Makesh Pravin John Wilson, San Diego, CA (US); Kiran Venugopal, Raritan, NJ (US); Tianyang Bai, Bridgewater, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/709,354

(22) Filed: Dec. 10, 2019

(65) Prior Publication Data

US 2020/0204240 A1 Jun. 25, 2020

Related U.S. Application Data

(60) Provisional application No. 62/784,362, filed on Dec. 21, 2018.

(51) Int. Cl.
*H04B 7/06* (2006.01)
*H04B 7/0456* (2017.01)
*H04B 7/0404* (2017.01)

(52) U.S. Cl.
CPC ......... *H04B 7/0691* (2013.01); *H04B 7/0404* (2013.01)

(58) Field of Classification Search
CPC ... H04B 7/0691; H04B 7/0404; H04B 7/0482
(Continued)

(56) References Cited

U.S. PATENT DOCUMENTS 10,517,124 B2* 12/2019 Balappanavar ..... H04W 40/205
2010/0279625 A1* 11/2010 Ko ........................ H04B 7/0691
455/68

(Continued)

FOREIGN PATENT DOCUMENTS

CN 108631831 A 10/2018
EP 3605863 A1 2/2020

OTHER PUBLICATIONS

Huawei, et al., "Antenna Selection Transmission for PUSCH", 3GPP Draft, 3GPP TSG RAN WG1 NR Ad Hoc Meeting#4, R1-1800909, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 13, 2018 (Jan. 13, 2018), XP051385158, 3 Pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018].

(Continued)

*Primary Examiner* — Inder P Mehra
(74) *Attorney, Agent, or Firm* — Danai Nelisile Mhembere; Patterson & Sheridan, LLP

(57) ABSTRACT

Certain aspects of the present disclosure provide techniques for user equipment (UE) antenna grouping for uplink transmission, such as dynamic antenna grouping for uplink transmission using multiple transmission configurations. A method that may be performed by a UE includes grouping one or more UE antennas into one or more groups and sending an indication of the one or more groups to a base station (BS). Another method that may be performed by a UE includes receiving an indication from a BS to group one or more UE antennas and grouping the one or more UE antennas based on the indication.

48 Claims, 12 Drawing Sheets

(58) Field of Classification Search
USPC ........................................................ 455/418
See application file for complete search history.

(56) References Cited

U.S. PATENT DOCUMENTS

| | | | |
|---|---|---|---|
| 2013/0039386 A1 | 2/2013 | Zhou et al. | |
| 2016/0143055 A1* | 5/2016 | Nammi | H04W 74/006 |
| | | | 370/329 |
| 2019/0053282 A1* | 2/2019 | Dinan | H04W 72/0406 |
| 2019/0089420 A1* | 3/2019 | Koskela | H04B 7/0417 |
| 2019/0280835 A1* | 9/2019 | Maattanen | H04L 5/0048 |
| 2019/0327045 A1* | 10/2019 | Zhang | H04L 5/0023 |

OTHER PUBLICATIONS

Huawei, et al., "Panel-Based UL Beam Selection", 3GPP Draft, 3GPP TSG RAN WG1 Meeting #95, R1-1813559, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051555614, 6 Pages, Retrieved from the Internet: URL: http://www.3gpp.org/ftp/Meetings%5F3GPP%5FSYNC/RAN1/Docs/R1%2D1813559%2Ezip [retrieved on Nov. 11, 2018], Sections 3-4.
International Search Report and Written Opinion—PCT/US2019/065614—ISA/EPO—dated Mar. 10, 2020.

* cited by examiner

USER EQUIPMENT (UE) ANTENNA GROUPING

CROSS-REFERENCE TO RELATED APPLICATION(S)

This application claims the benefit of and priority to U.S. Provisional Application No. 62/784,362, filed Dec. 21, 2018, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for user equipment (UE) antenna grouping.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. new radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes grouping one or more UE antennas into one or more groups. The method generally includes sending an indication of the one or more groups to a base station (BS).

Certain aspects provide another method for wireless communication by a UE. The method generally includes receiving an indication to group one or more UE antennas from a BS. The method generally includes grouping the one or more UE antennas based on the indication.

Certain aspects provide a method for wireless communication by a BS. The method generally includes receiving, from a UE, an indication of one or more groups of one or more UE antennas. The method generally includes communicating with the one or more groups of one or more UE antennas based on the indication.

Certain aspects provide another method for wireless communication by a BS. The method generally includes signaling a UE to group one or more UE antennas into one or more UE antenna groups. The method generally includes receiving a transmission from the UE via one or more of the UE antenna groups.

Certain aspects provide an apparatus for wireless communication. The apparatus generally includes a memory and at least one processor coupled with the memory. The memory and processor are generally configured to group one or more antennas of the apparatus into one or more groups and to send an indication of the one or more groups to another apparatus.

Certain aspects provide an apparatus for wireless communication. The apparatus generally includes a memory and at least one processor coupled with the memory. The memory and processor are generally configured to receive an indication to group one or more antennas of the apparatus from another apparatus and to group the one or more antennas of the apparatus based on the indication.

Certain aspects provide an apparatus for wireless communication. The apparatus generally includes a memory and at least one processor coupled with the memory. The memory and processor are generally configured to receive, from another apparatus, an indication of one or more groups of one or more antennas of the other apparatus and to communicate with the one or more groups of one or more antennas of the other apparatus based on the indication.

Certain aspects provide an apparatus for wireless communication. The apparatus generally includes a memory and at least one processor coupled with the memory. The memory and processor are generally configured to signal another apparatus to group one or more antennas of the other apparatus into one or more antenna groups and to receive a transmission from the other apparatus via one or more of the antenna groups.

Certain aspects provide an apparatus for wireless communication. The apparatus generally includes means for grouping one or more antennas of the apparatus into one or more groups and means for sending an indication of the one or more groups to another apparatus.

Certain aspects provide an apparatus for wireless communication. The apparatus generally includes means for receiving an indication to group one or more antennas of the apparatus from another apparatus and means for grouping the one or more antennas of the apparatus based on the indication.

Certain aspects provide an apparatus for wireless communication. The apparatus generally includes means for receiving, from another apparatus, an indication of one or more groups of one or more antennas of the other apparatus and means for communicating with the one or more groups of one or more antennas of the other apparatus based on the indication.

Certain aspects provide an apparatus for wireless communication. The apparatus generally means for signaling another apparatus to group one or more antennas of the other apparatus into one or more antenna groups and means for receiving a transmission from the other apparatus via one or more of the antenna groups.

Certain aspects provide a computer readable medium storing computer executable code thereon for wireless communication. The computer readable medium generally includes code for grouping one or more UE antennas into one or more groups and code for sending an indication of the one or more groups to a BS.

Certain aspects provide a computer readable medium storing computer executable code thereon for wireless communication. The computer readable medium generally includes code for receiving an indication to group one or more UE antennas from a BS and code for grouping the one or more UE antennas based on the indication.

Certain aspects provide a computer readable medium storing computer executable code thereon for wireless communication. The computer readable medium generally includes code for receiving, from a UE, an indication of one or more groups of one or more UE antennas and code for communicating with the one or more groups of one or more UE antennas based on the indication.

Certain aspects provide a computer readable medium storing computer executable code thereon for wireless communication. The computer readable medium generally includes code for signaling a UE to group one or more UE antennas into one or more UE antenna groups and code for receiving a transmission from the UE via one or more of the UE antenna groups.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
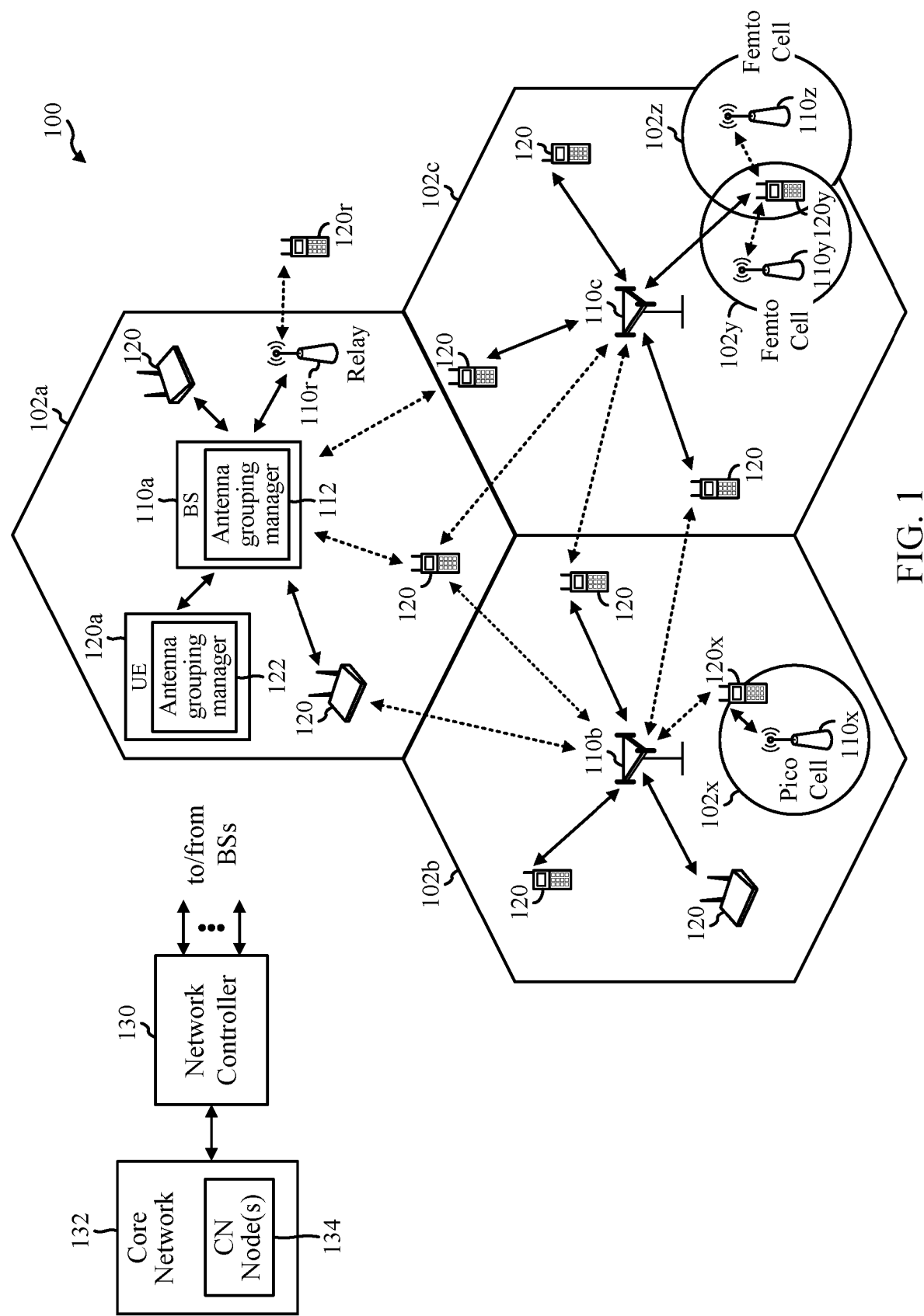
FIG. 1 is a block diagram conceptually illustrating an example telecommunications system, in accordance with certain aspects of the present disclosure.

Aspects of the present disclosure provide apparatus, methods, processing systems, and computer readable mediums for user equipment (UE) antenna grouping.

In certain systems, a UE may be able to communicate with a base station (BS) using different transmission configurations, such as different antennas, beams, and/or antenna panels (e.g., antenna arrays). In some cases, the UE can transmit simultaneously (e.g., near simultaneously, concurrently, and/or within a transmission time interval (TTI)) using the different transmission configurations. In some cases, the UE may group (or regroup) UE antennas. The antenna grouping may be dynamic. The grouping may form, destroy, or change UE antenna panels. As used herein grouping may refer to an initial grouping or may refer to a regrouping. As used herein, a UE antenna panel may refer to a group of one or more UE antennas, an array of one or more UE antennas, or more generally, a set of one or more UE antennas that the UE uses (e.g., together) for communicating (e.g., for uplink transmission). Because the dynamic grouping affects the configuration of UE antenna panels at the UE, the grouping may impact uplink transmission. Thus, the BS should be aware of the dynamic grouping and/or information related to the grouping.

Accordingly, aspects of the present disclosure provide techniques for UE antenna grouping for uplink transmission. In some examples, techniques are provided for coordinating the UE antenna grouping (or regrouping) between the UE and the BS. In some examples, the BS can request or direct the antenna grouping at the UE. In some examples, the UE can indicate the grouping to the BS and/or the UE can provide information related to the grouping to the BS. In some examples, based on the grouping, the BS may track changes to one or more UE parameters. In some examples, the BS makes control decisions based on the grouping, the information related to the grouping, and/or the changed UE parameters. Thus, the grouping can be coordinated between the UE and BS, and can be handled such that uplink transmission is not negatively impacted.

The following description provides examples of UE antenna grouping, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless networks and radio technologies. For clarity, while aspects may be described herein using terminology commonly associated with 3G, 4G, and/or 5G wireless technologies, aspects of the present disclosure can be applied in other generation-based communication systems, including later technologies.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR may support beamforming and beam direction may be dynamically configured. NR may support multiple-input multiple-output (MIMO) transmissions with precoding. MIMO configurations in the downlink may support up to 8 transmit antennas with multi-layer downlink transmissions up to 8 streams and up to 2 streams per user equipment (UE). NR may support multi-layer transmissions with up to 2 streams per UE. NR may support aggregation of up to 8 serving cells.

FIG. 1 illustrates an example wireless communication network 100 in which aspects of the present disclosure may be performed. As shown in FIG. 1, the wireless communication network 100 may be in communication with a core network 132. The core network 132 may be in communication with one or more base station (BSs) 110 and/or UEs 120 in the wireless communication network 100 via one or more interfaces. The wireless communication network 100 may be a 5G NR network.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a cell, which may be stationary or may move according to the location of a mobile BS 110. In some examples, the BSs 110 may be interconnected to one another and/or to one or more other BSs 110 or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells. A network controller 130 may couple to a set of BSs and provide coordination and control for these BSs. The network controller 130 may communicate with the BSs 110 via a backhaul.

The BSs 110 communicate with UEs 120a-y (each also individually referred to herein as UE 120 or collectively as UEs 120). The UEs 120 may be dispersed throughout the wireless communication network 100, and each UE 120 may be stationary or mobile. Wireless communication network 100 may also include relay stations (e.g., relay station 110r), also referred to as relay BSs, relays, and the like, that receive a transmission of data and/or other information from an upstream station (e.g., a BS 110a or a UE 120r) and send a transmission of the data and/or other information to a downstream station (e.g., a UE 120 or a BS 110) or that relays transmissions for between UEs 120 to facilitate communication between devices.

According to certain aspects, the UEs 120 may be configured for multi-panel uplink transmission. For example, the UE 120a may be configured with multiple transmission configurations (e.g., antenna arrays/panels and/or beams) for uplink transmission to the BS 110a. As shown in FIG. 1, the UE 120a has an antenna grouping manager 122. The antenna grouping manager 122 may be configured to group one or more UE antennas into one or more groups and send an indication of the one or more groups to the BS 110a, according to aspects described herein. As shown in FIG. 1, The BS 110a has an antenna grouping manager 112. The antenna grouping manager 112 may be configured to receive the indication of the one or more groups from the UE 120a and communicate with the UE 120a via the one or more groups based on the indication, according to aspects of the disclosure. In some examples, the antenna grouping manager 112 of the BS 110a may be configured to signal the UE 120a to group one or more UE antennas into one or more UE antenna groups and to receive a transmission from the UE 120a via one or more of the UE antenna groups based on the indication, according to aspects described herein. In some examples, the antenna grouping manager 122 of the UE 120a may be configured to receive the indication from the BS 110a to group one or more UE antenna into one or more UE antenna groups and to group the one or more UE antennas based on the indication.

Figure 2:
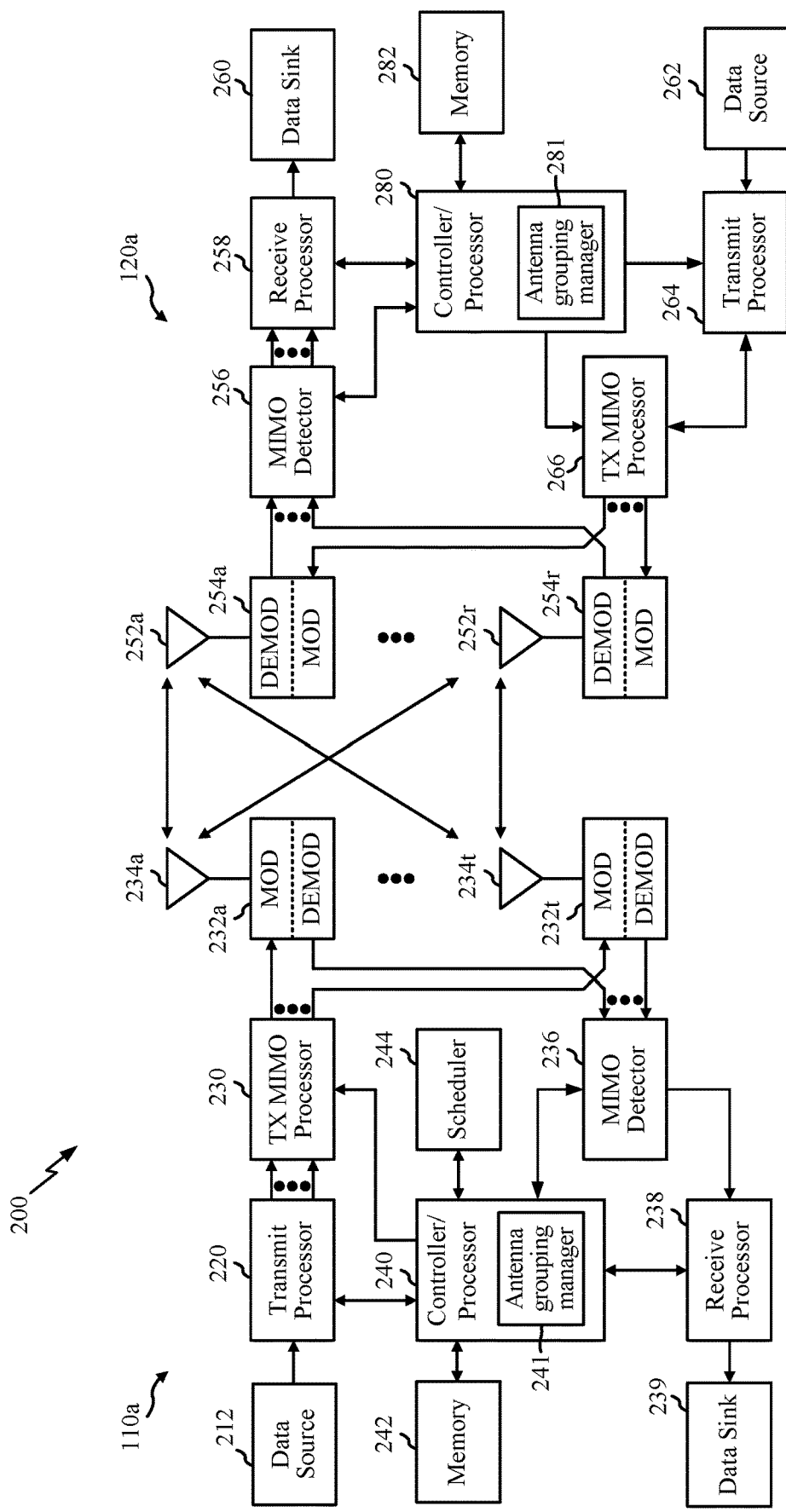
FIG. 2 is a block diagram conceptually illustrating a design of an example base station (BS) and user equipment (UE), in accordance with certain aspects of the present disclosure.

FIG. 2 illustrates example components of BS 110a and UE 120a (as depicted in FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and channel state information reference signal (CSI-RS). A transmit (TX) MIMO processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120a, the antennas 252a through 252r may receive the downlink signals from the BS 110a and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a through 254r (e.g., for SC-FDM, etc.), and transmitted to the BS 110a.

Antennas 252, processors 266, 258, 264, and/or controller/processor 280, and/or other components of the UE 120a may be used to perform the various techniques and methods described herein UE antenna grouping for uplink transmission. Antennas 234, processors 220, 230, 238, and/or controller/processor 240, and/or other components of the BS 110a may be used to perform the various techniques and methods described herein UE antenna grouping for uplink transmission. For example, as shown in FIG. 2, the processor 280 of the UE 120a has an antenna grouping manager 281 that may be configured for antenna grouping, according to aspects described herein. As shown in FIG. 2, the processor 240 of the BS 110a has an antenna grouping manager 241 that may be configured for antenna grouping, according to aspects described herein.

NR may utilize orthogonal frequency division multiplexing (OFDM) with cyclic prefix (CP) on and single-carrier frequency division multiplexing (SC-FDM) on the uplink and/or downlink. NR may support half-duplex operations using time division duplexing (TDD). OFDM and SC-FDM partition the system bandwidth into multiple orthogonal subcarriers, also referred to as tones, bins, etc. Each subcarrier may be modulated with data. Modulation symbols are sent in the frequency domain with OFDM and in the time domain with SC-FDM. The spacing between adjacent subcarriers may be fixed, and the total number of subcarriers may be dependent on the system bandwidth. In NR, the minimum resource allocation (e.g., a resource block (RB)) may be 12 consecutive subcarriers (or 180 kHz). The system bandwidth may also be partitioned into subbands that may cover multiple RBs (e.g., 6 RBs). NR may support a base subcarrier spacing (SCS) of 15 KHz and other SCS may be defined with respect to the base SCS (e.g., 30 kHz, 60 kHz, 120 kHz, 240 kHz, etc.).

Figure 3:
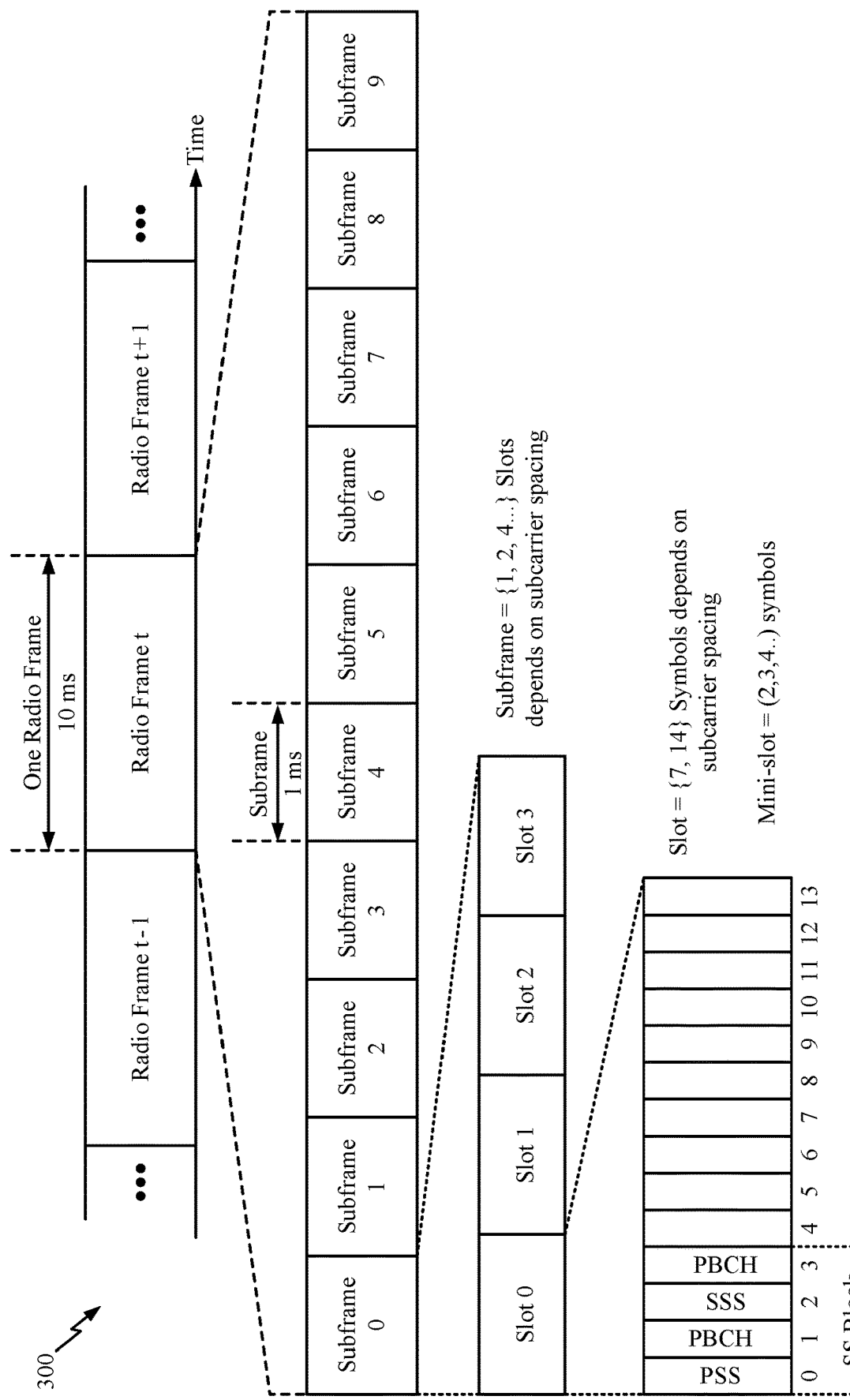
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. In NR, the basic TTI is referred to as a slot. Each subframe may include a variable number of slots depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data and/or DL/UL control information.

In certain systems, a UE (e.g., the UE 120a) can transmit uplink signals with different transmission configurations. The uplink transmissions with different transmission configurations may be simultaneous (e.g., actually simultaneous, near simultaneous, concurrent, and/or within a TTI). The uplink transmissions with different transmission configurations may use the same frequency band. The uplink transmissions may be to the serving BS (e.g., the BS 110a). As used herein, a transmission configuration may be associated with, but not limited to, transmission reception points (TRPs), antennas, antenna arrays/panels, beams (e.g., for mmW), channels, links, and/or quasi co-location (QCL) groups. In some examples, a UE may have up to sixteen antennas in one array/panel, and the UE may have multiple arrays/panels which may be located at various locations of the UE. In some examples, different arrays may use different beams to form multiple links. The different antennas, antenna panels, and/or beam cover different spatial directions.

Simultaneous uplink transmissions may allow increased throughput. For example, throughput may be increased by simultaneously transmitting different information to the BS using multiple transmission configurations. Simultaneous uplink transmission may allow increased reliability. For example, reliability may be increased by sending the same information from the multiple transmission configurations.

In certain systems, such as NR (e.g., 5G NR), uplink transmission with multiple transmission configurations may be configured for PUSCH and/or SRS transmissions by the UE. In some examples, the UE is configured with one or more SRS resource sets configuring SRS resources for SRS transmission. Each SRS resource set may be associated with a UE antenna panel for both codebook-based (e.g., beamformed) and non-codebook based (e.g., non-beamformed) PUSCH transmission. In some examples, an SRS resource indicator (SRI) field in downlink control information (DCI) may be used to indicate (by the BS) and select (by the UE) multiple SRS resources from the configured SRS resource sets. Each SRS resource set may be associated with a UE antenna panel. For example, the BS and UE may be configured with a table or mapping of the SRI field to an SRS resource from an SRS resource set for an uplink transmission. In some examples, the SRI in the DCI may indicate multiple SRS resources from one SRS resource set. In some examples, of the multiple SRS resources indicated by the BS, the UE may select one to use for uplink transmission.

Figure 4:
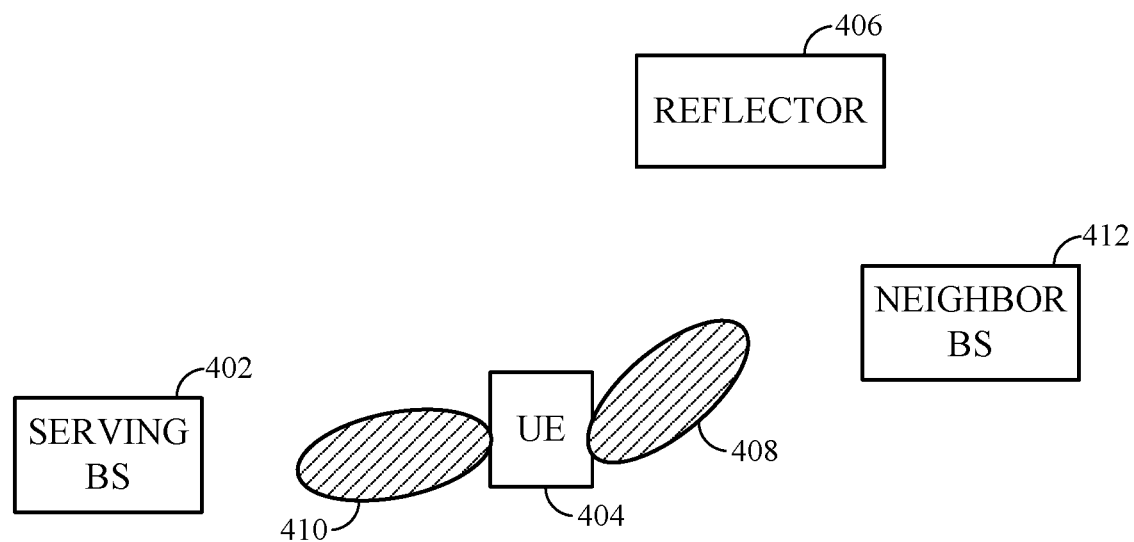
FIG. 4 illustrates an uplink transmission scenario using different antenna panels, in accordance with certain aspects of the present disclosure.

FIG. 4 illustrates an example multi-panel uplink transmission scenario leading to different signals path which may cause different amounts of interference by different uplink signals transmitted from the UE via different transmission configurations, in accordance with certain aspects of the present disclosure. As shown in FIG. 4, the UE 404 can send a first uplink transmission 410 to the BS 402 with a first transmission configuration (e.g., a first antenna, beam, and/or antenna panel). As shown in FIG. 4, the first uplink transmission with the first transmission configuration may be oriented generally towards the serving BS 402. The UE can send a second uplink transmission 408 using a second uplink transmission 408 configuration (e.g., a second antenna, beam, and/or antenna panel). In some examples, the first uplink transmission 410 and the second uplink transmission 408 may be transmitted simultaneously or concurrently. As shown in FIG. 4, the second uplink transmission 408 may be oriented generally in a different direction than the first uplink transmission 410, which may be toward a reflector 406 and/or a neighboring BS 412.

Figure 5:
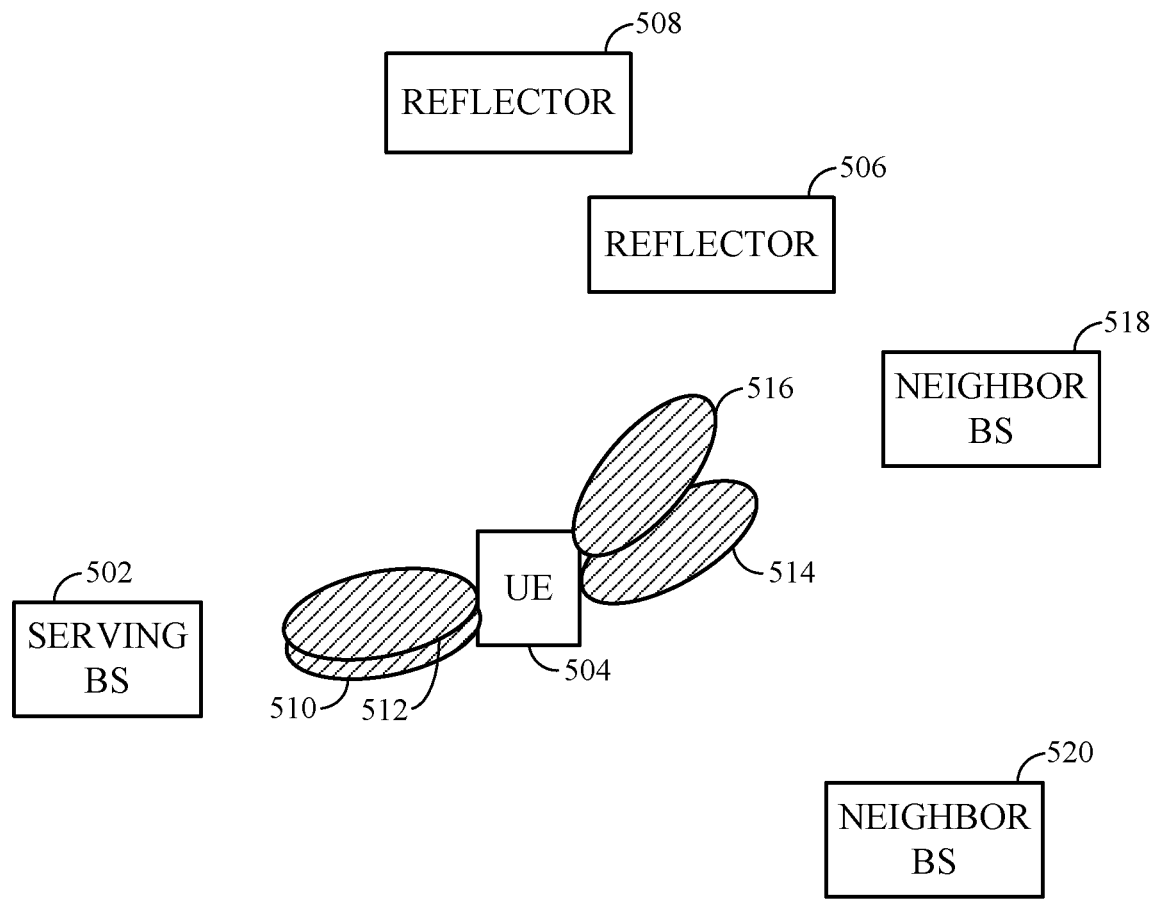
FIG. 5 illustrates another uplink transmission scenario, in accordance with certain aspects of the present disclosure.

The uplink transmission scenario illustrated in FIG. 4 is merely illustrative. It should be appreciated that many different scenarios are possible. For example, as shown in FIG. 5, the UE 504 can transmit multiple uplink transmissions 510, 512, 514, 516 using different transmission configurations for each of the uplink transmissions. For example, the different transmission configurations may use different antenna panels, different beams in beamformed directions from one antenna panel, or both different antenna panels and different beamformed directions. As shown in FIG. 5, uplink transmissions 510, 512 may be oriented generally towards the serving BS 502, while uplink transmissions 514, 516 may be oriented generally towards a neighboring BS 518. The uplink transmissions can use only a single panel/array and/or beam at a time, or the UE can transmit simultaneous uplink transmissions using multiple different antenna panels/arrays and/or beams. The serving BS 502, UE 504, and neighbor BSs 518, 520 may include any number of arrays and arrays including any number of antennas. The antennas and/or antenna panels/arrays may be at any location on the front, sides, or back of the UE, and there may be any number of uplink transmissions transmitted via the multiple antennas and/or antenna panels. There may be various numbers of neighboring BSs and/or other UEs interfered by uplink transmissions from the UE 504. Further, there could be various numbers of signal reflectors, at multiple different possible locations in the system, that reflect signals in any of various directions, and any one signal could be reflected via multiple signal reflectors.

Example UE Antenna Grouping for Uplink Transmission

As discussed above, a user equipment (UE) may be configured to communicate via one or more transmission configurations, which may include one or more UE antenna panels. As discussed above, a UE antenna panel may refer to a group or array of UE antennas that the UE uses for communication. In some examples, the group or array of UE antennas are used together (e.g., concurrently, simultaneously, near simultaneously, and/or within a transmission time interval (TTI)) or are switched between for uplink transmission.

According to certain aspects, the UE may group and/or regroup its UE antennas. For example, the UE can group (or regroup) antennas to form, destroy, or change its configuration of UE antenna panel(s). In some examples, the UE dynamically groups and/or regroups UE antennas. For example, the UE antennas may be grouped or regrouped based on various different considerations, targets, or scenarios that may be determined by the UE, the network (e.g., a BS), or another entity.

Figure 6:
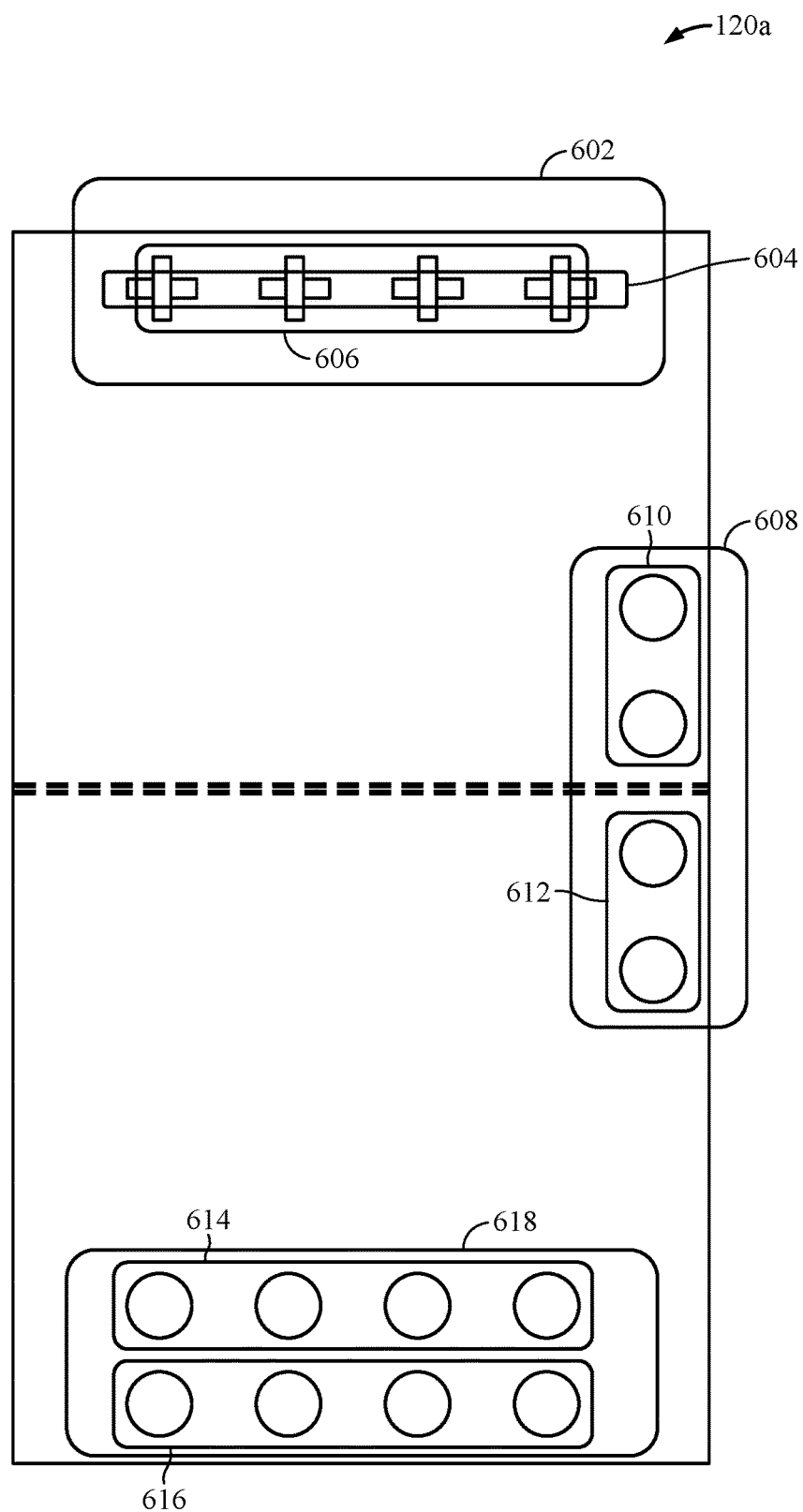
FIG. 6 illustrates example UE antenna groups, in accordance with certain aspects of the present disclosure.

FIG. 6 illustrates example UE antenna groupings for an example UE 120a, in accordance with certain aspects of the present disclosure. The UE 120a can have vertically polarized (v-pol) antennas and horizontally polarized (h-pol) antennas. As shown in FIG. 6, the UE antenna group 602 includes both a grouping of h-pol antennas 604 and a grouping of v-pol antennas 606. The UE antenna group 602 including both v-pol and h-pol antennas may be associated with a higher rank (e.g. number of layers) than UE antenna groups with only h-pol or only v-pol antennas. Higher rank may involve more transmit and/or receive processing overhead. Thus, in some examples, the UE antenna grouping or regrouping may be based on whether higher or lower rank is desired and/or based on whether higher or lower processing overhead is supported and/or desired.

In some cases, one or more UE antennas may be blocked, which may affect the signal. Thus, in some examples, the UE antenna grouping may avoid including blocked antennas.

A beam using more UE antennas (e.g., four UE antennas such as in the UE antenna groups 608, 614, 616) may enable a narrower, more focused beam, and a higher signal-to-noise ratio (SNR) than a beam using fewer antennas (e.g., two UE antennas such as the UE antenna groups 610 and 612). The narrower and more focused beam may involve higher processing overhead, such as more resources to track, while a wider beam may allow less resources to track. Thus, in some examples, the UE antenna grouping or regrouping may be on a desired or target SNR and/or a desired or target overhead.

As shown in FIG. 6, in some cases, the UE 120a can fold (e.g., along the dotted line shown in FIG. 6). Thus, in some examples, the UE antennas may be grouped or regrouped to form a bigger panel (e.g., the top and bottom UE antennas after the folding such as the UE antenna groups 602 and 618). As discussed above, the grouping may take into account whether more or less UE antennas are desirable for a narrower or wider beam. For example, if high SNR is desired and the direction (and/or elevation) for the transmission/beam is known, then a larger UE antenna group may be formed (e.g., two rows such as the UE antenna group 618), while if lower SNR is desired and/or the direction is not known, then a small UE antenna group may be formed (e.g., a single row such as the UE antenna groups 614 and 616).

The above examples are merely illustrative. The grouping or regrouping may involve different UE antennas than those illustrated in FIG. 6 located at other locations on the UE 120*a* and forming groups of different configurations than those shown FIG. 6. In addition, the grouping or regrouping may be based on other parameters and/or considerations than those described above.

The grouping or regrouping of UE antennas and/or UE antenna panels may impact uplink communication, such as uplink transmission using different transmission configurations. Thus, it is desirable that the BS is aware of the grouping, that the BS has information related to the grouping, and/or that the grouping is coordinated between the UE and BS. For example, the BS may make control decisions based on the grouping. In some examples, the B S may track the UE parameters, states, and/or variables that the B S uses to make control decisions and that may be affected/changed based on the grouping and/or regrouping of the UE antennas. When the grouping changes, the UE parameters, states, and/or variables tracked by the BS may be updated.

Aspects of the present disclosure provide for UE antenna grouping that may allow the grouping to be coordinated/indicated between the UE and the BS. In some examples, the UE indicates the grouping to the BS and/or the UE provides information related to the grouping to the BS. In some examples, based on the grouping, the BS may track changes to one or more UE parameters and makes control decision based on the grouping, the information related to the grouping, and/or the UE parameters. Thus, the grouping can be handled such that uplink transmission is not negatively impacted, thereby, allowing the higher reliability and/or throughput that can be achieved uplink transmission, including for simultaneous uplink transmission with different transmission configurations.

Figure 7:
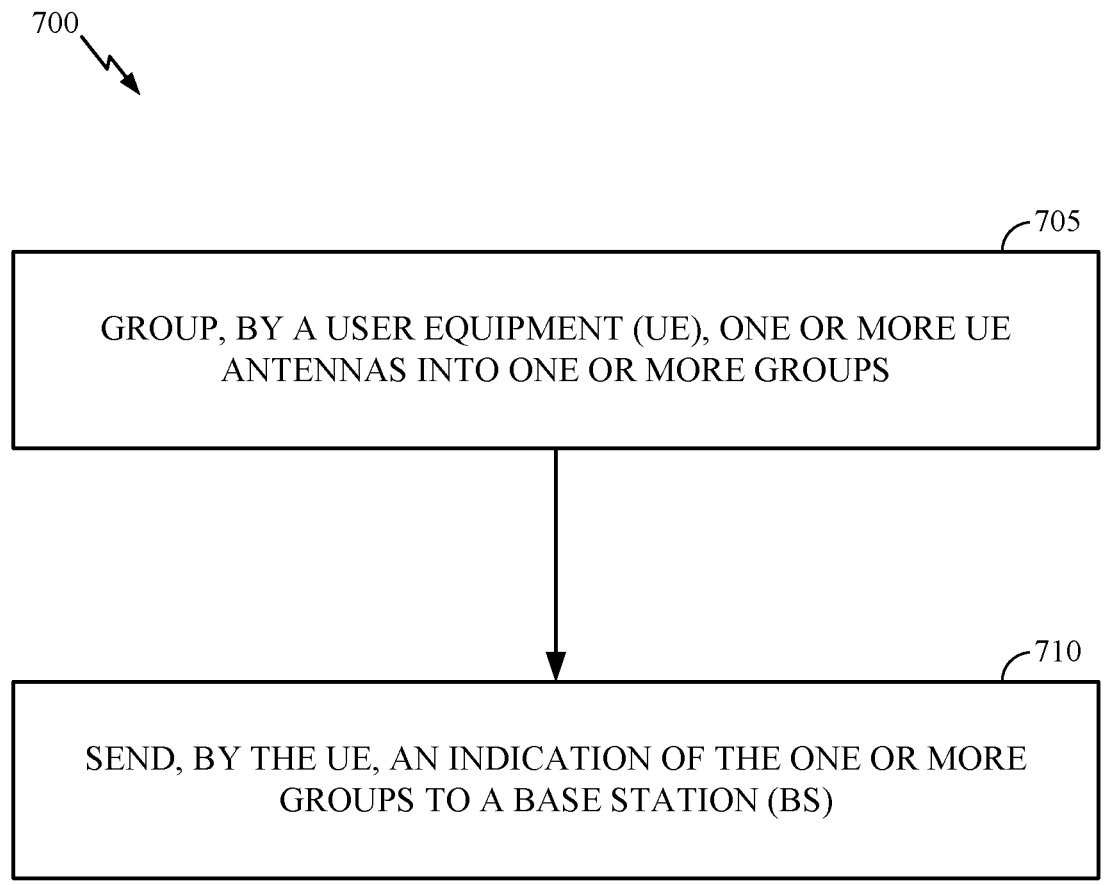
FIG. 7 is a flow diagram illustrating example operations by a UE for wireless communication, in accordance with certain aspects of the present disclosure.
Figure 8:
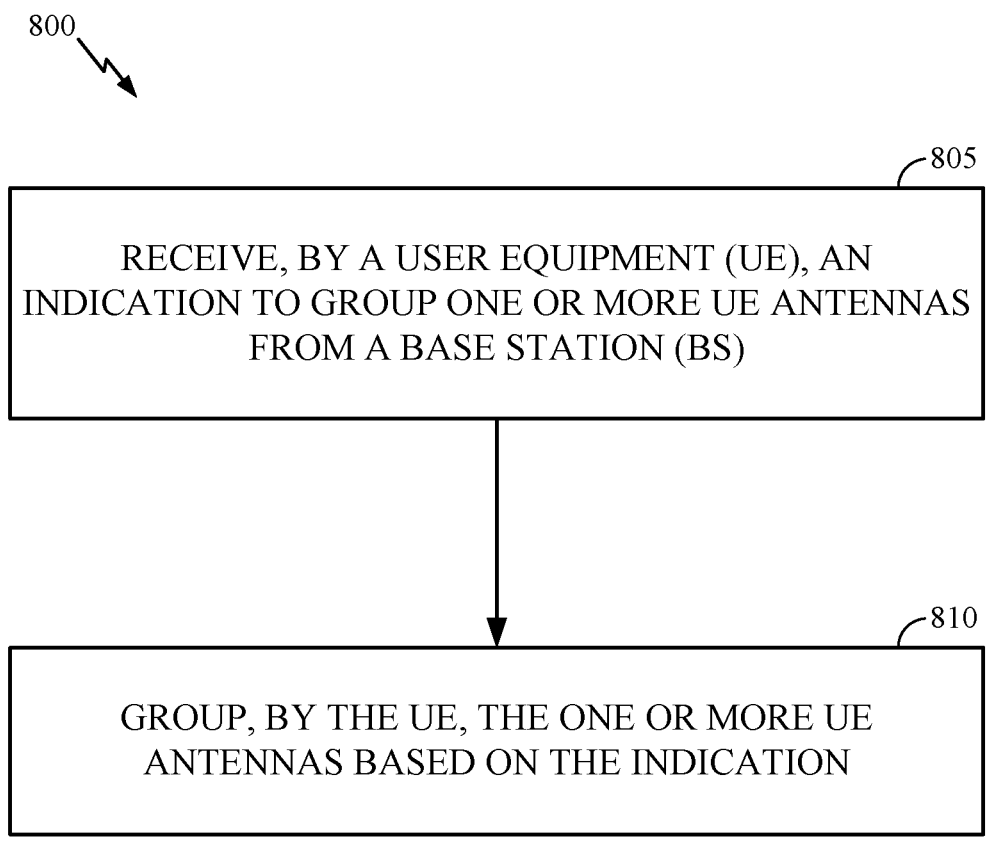
FIG. 8 is another flow diagram illustrating example operations by a UE for wireless communication, in accordance with certain aspects of the present disclosure.

FIG. 7 and FIG. 8 are flow diagrams illustrating example operations 700 and 800, respectively, for wireless communication, in accordance with certain aspects of the present disclosure. The operations 700 and/or 800 may be performed, for example, by a UE (e.g., such as a UE 120*a* in the wireless communication network 100). Operations 700 and/or 800 may be implemented as software components that are executed and run on one or more processors (e.g., processor 280 of FIG. 2). Further, the transmission and reception of signals by the UE in operations 700 and/or 800 may be enabled, for example, by one or more antennas (e.g., antennas 252 of FIG. 2). In certain aspects, the transmission and/or reception of signals by the UE may be implemented via a bus interface of one or more processors (e.g., processor 280) obtaining and/or outputting signals.

The operations 700 may begin, at 705, by grouping (or regrouping) one or more UE antennas into one or more groups. In some examples, the UE dynamically groups the UE antennas. The grouping may form one or more UE antenna groups (e.g., form a UE antenna set, panel, array, etc.), destroy (e.g., de-configure) one or more UE antenna groups, and/or change one or more UE antenna groups. In some examples, the UE determines the grouping based on a message (e.g., a request, indication, or command) from the BS. For example, the UE may receive a message from the BS that indicates the UE antennas to include in one or more UE antenna groups. In some examples, the UE may receive a message from the BS that indicates one or more target parameters and the UE can determine the grouping or regrouping to satisfy the one or more target parameters. For example, the BS may indicate a target rank, a target precoder size, and/or target beam parameter, a target antenna port, and/or a combination thereof in the message. In some examples, the dynamic grouping or regrouping may be based on any of the parameters and/or considerations described above with respect to FIG. 6 and/or may be based on other parameters and/or considerations.

At 710, the UE sends an indication of the one or more groups to a BS. In some example, the UE sends the BS an indication that the UE has grouped (and/or regrouped) or will group (and/or regroup) the UE antennas. According to certain aspects, the UE may provide information to the BS related to the grouping or regrouping. In some examples, the information is provided in response to a request from the BS for the information. In some examples, the UE indicates a time at which the UE performs the grouping (e.g., a time that the UE applies, or begins to use, the grouping), a duration that the grouping applies, or both. In some examples, the UE indicates the UE antennas and/or UE antenna groups affected by the grouping, the UE antennas included in the at least one UE antenna group, or both. In some examples, the UE indicates one or more parameters (or a change to the parameters) associated with the at least one UE antenna group, such as a rank, a precoder size, beam parameters, UE antenna ports, or a combination thereof.

According to certain aspects, the UE receives signaling from the BS based on the grouping, regrouping, and/or information related to the grouping. In some examples, the UE receives control signaling from the BS based on the grouping, regrouping, and/or information related to the grouping. In some examples, the UE receives scheduling and/or a configuration for uplink transmission based on the grouping, regrouping, and/or information related to the grouping. In some examples, the UE receives, from the BS, in response to the indication of the grouping, an indication of one or more sounding reference signal (SRS) resources, reference signal parameters, and/or transmit power parameters from the BS. The UE may receive a configuration of one or more SRS resource sets. Each SRS resource set may include one or more SRS resources. Each SRS resource set may be associated with one or more UE antenna groups (e.g., panels). In some examples, the UE receives signaling from the BS activating or deactivating one or more of the configured SRS resource sets based on the grouping, for example, to activate or deactivate the corresponding UE antenna groups/panels. For example, the signaling from the BS may activate one or more SRS resource sets associated with a plurality UE antenna groups for a PUSCH) transmission, such as a simultaneous PUSCH transmission with multiple transmission configurations.

According to certain aspects, the UE can send the BS an indication of a preferred number of UE antenna groups.

One or more of the indications, signaling, transmissions and/or information from the UE, described herein, may be provided via a physical uplink control channel (PUCCH), a medium access control control element (MAC-CE), and/or radio resource control (RRC) signaling. One or more indication, transmissions, or signaling from the BS, described herein, may be provide via a physical downlink control channel (PDCCH), a MAC-CE, and/or RRC signaling.

The operations 800 may begin, at 805, by receiving an indication to group (and/or regroup) one or more UE antennas from a BS. The BS may indicate how to group the UE antennas. For example, the BS may indicate specific UE antenna groups (e.g., antenna panels) to group/regroup and/ or specific UE antennas to include in the UE antenna groups. In some examples, the BS may indicate one or more target parameters and the grouping or regrouping can be determined to satisfy the one or more target parameters. For example, the BS may indicate a target rank, a target precoder size, and/or target beam parameter, a target antenna port, and/or a combination thereof. The BS may signal changes in reference signal parameters for the grouped/regrouped UE antenna groups. At 810, the UE groups the one or more UE antennas based on the indication.

Figure 9:
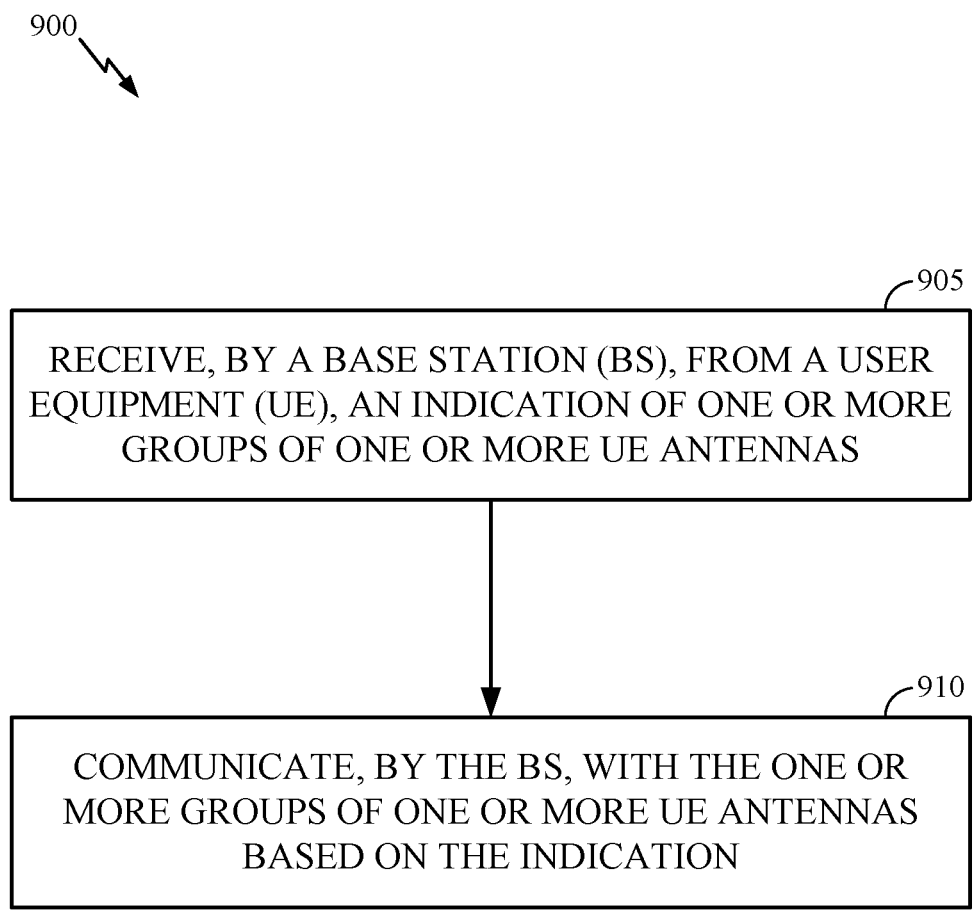
FIG. 9 is a flow diagram illustrating example operations by a BS for wireless communication, in accordance with certain aspects of the present disclosure.
Figure 10:
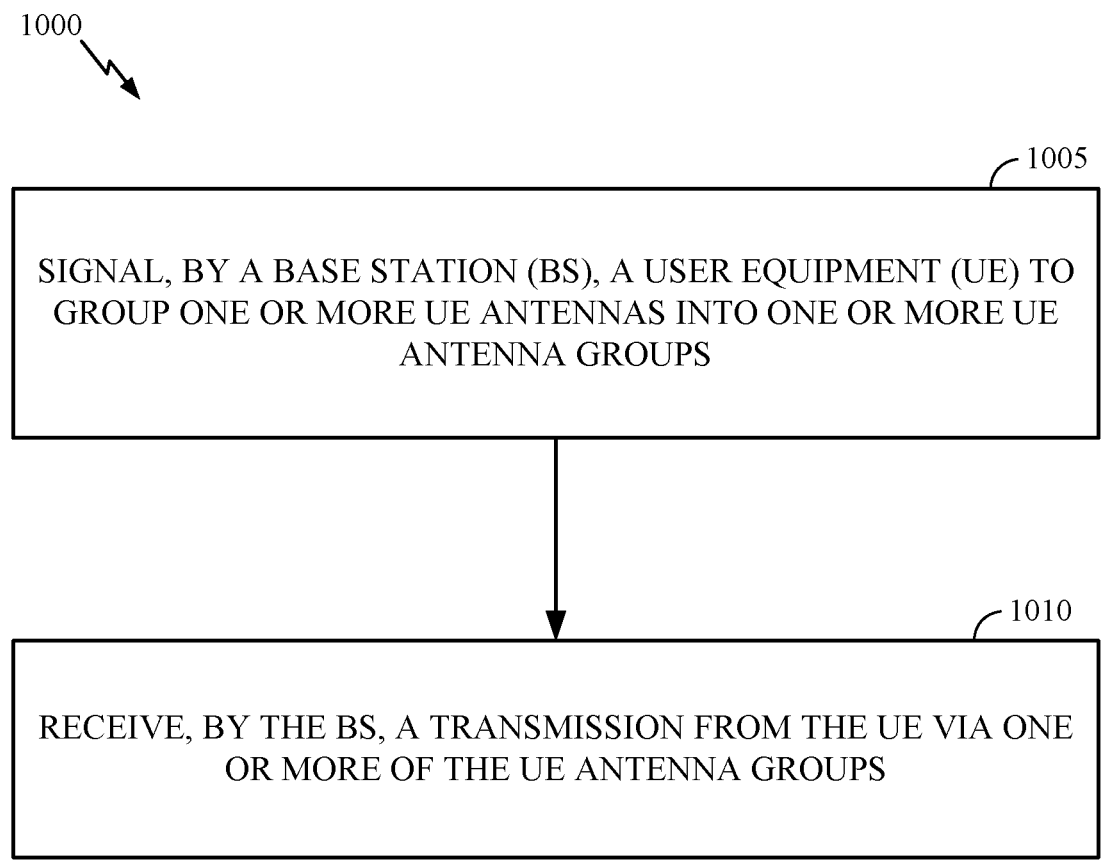
FIG. 10 is another flow diagram illustrating example operations by a BS for wireless communication, in accordance with certain aspects of the present disclosure.

FIG. 9 and FIG. 10 are flow diagrams illustrating example operations 900 and 1000, respectively, for wireless communication, in accordance with certain aspects of the present disclosure. The operations 900 and/or 1000 may be performed, for example, by a BS (e.g., such as the BS 110a in the wireless communication network 100). The operations 900 and 1000 may be complimentary operations by the BS to the operations 700 and 800, respectively, performed by the UE. Operations 900 and/or 1000 may be implemented as software components that are executed and run on one or more processors (e.g., processor 240 of FIG. 2). Further, the transmission and reception of signals by the BS in operations 900 and/or 1000 may be enabled, for example, by one or more antennas (e.g., antennas 234 of FIG. 2). In certain aspects, the transmission and/or reception of signals by the BS may be implemented via a bus interface of one or more processors (e.g., processor 240) obtaining and/or outputting signals.

The operations 900 may begin, at 905, by receiving, from a UE, an indication of one or more groups of one or more UE antennas. As discussed above, the BS may transmit a message (e.g., indication, request, command) to the UE to perform the grouping and the message may indicate the UE antennas and/or the UE antenna panels to group and/or the message may indicate one or more target parameters (e.g., rank, precoder size, beam parameter, antenna port, etc.) to be achieved by the grouping.

At 910, the BS communicates with the one or more groups of one or more UE antennas based on the communication. For example, the BS may determine one or more changed UE parameters based on the indication. In some examples, the BS may track (e.g., determine, monitor, and/or store) information associated with the UE antenna grouping. The BS may update the information based on the UE grouping/regrouping. As discussed above, the BS may also receive information from the UE related to the grouping, such as when the grouping applies, a duration the grouping is valid, antennas and/or antenna panels include in and/or affected by the grouping, and/or one or more parameters associated with the grouping (e.g., rank, precoder size, beam parameters, antenna ports, etc.). In some examples, the BS may request the information from the UE and the information is received from the UE in response to the request. The BS may determine one or more changed UE parameters based on the indication from the UE of the grouping and/or based on the information from the UE related to the grouping.

According to certain aspects, the BS transmits an indication of one or more reference signal parameters for the at least one UE antenna group, for example, based on the changed UE parameters. The BS may configure the UE with SRS resource sets. Each SRS resource set may include one or more SRS resources. Each SRS resource set may be associated with one or more UE antenna groups. In some examples, the BS signals the UE to activate or deactivate one or more of the configured SRS resource sets based on the grouping, information related to the grouping, the changed UE parameters, and/or the preferred number of UE antenna groups. The signaling may activate one or more SRS resource sets associated with a plurality of UE antenna groups for a multi-panel PUSCH transmission.

According to certain aspects, the BS may receive an indication from the UE of a preferred number of UE antenna groups.

One or more of the indications, signaling, transmissions and/or information from the UE, described herein, may be via a PUCCH, a MAC-CE, and/or RRC signaling. One or more indication, transmissions, or signaling from the BS, described herein, may be via a PDCCH, a MAC-CE, and/or RRC signaling.

The operations 1000 may begin, at 1005, by signaling a UE to group one or more UE antennas into one or more UE antenna groups. At 1010, the BS receives a transmission from the UE via one or more of the UE antenna groups.

Figure 11:
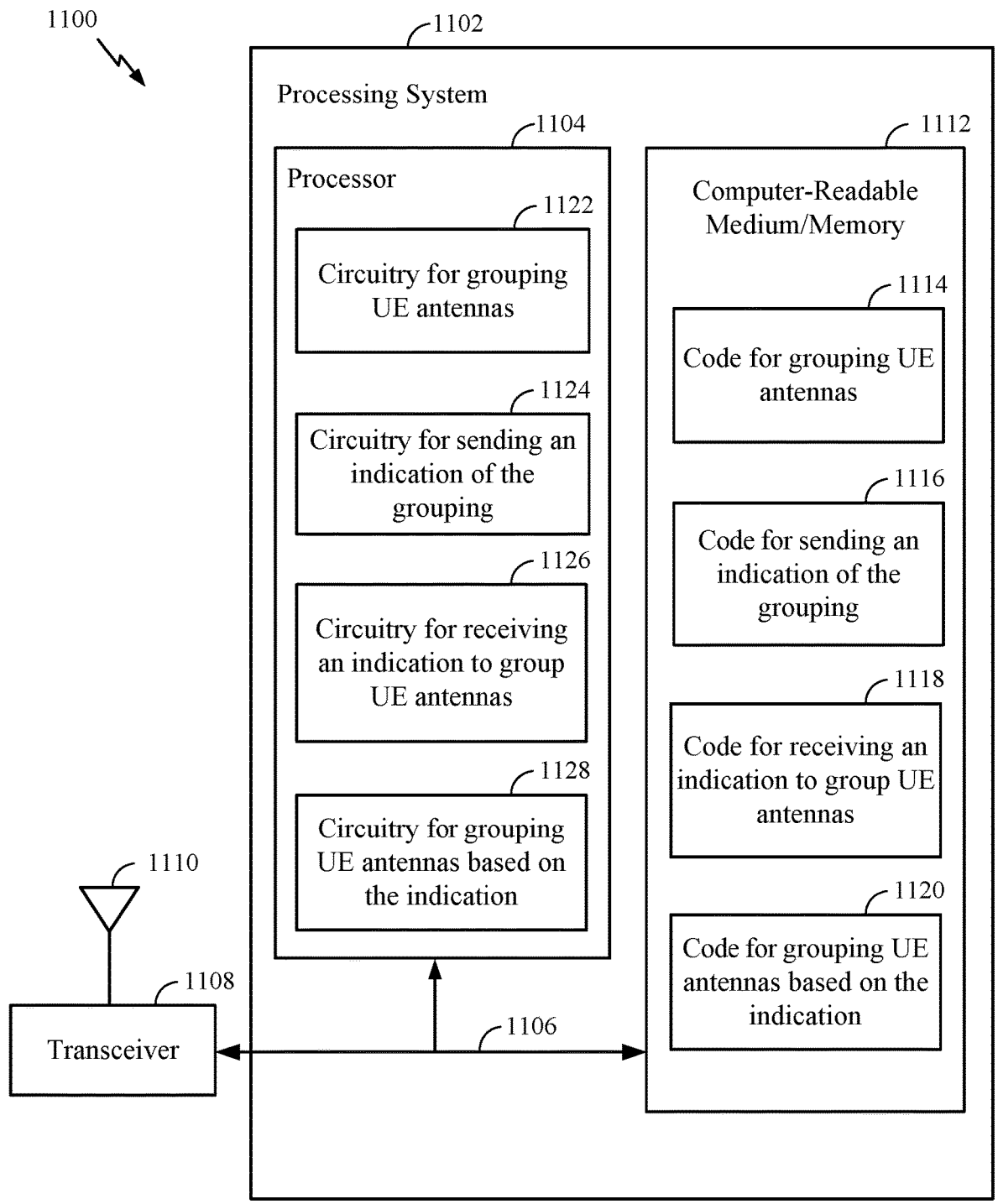
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 7 and/or FIG. 8. The communications device 1100 includes a processing system 1502 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/ memory 1112 is configured to store instructions (e.g., computer-executable code) that when executed by the processor 1104, cause the processor 1104 to perform the operations illustrated in FIG. 7 and/or FIG. 8, or other operations for performing the various techniques discussed herein for dynamic UE antenna grouping. In certain aspects, computer-readable medium/memory 1112 stores code 1114 for grouping one or more UE antennas; code 1116 for sending an indication of the grouping; code 1118 for receiving an indication to group one or more UE antennas; and/or code 1120 for grouping the one or more UE antennas based on the indication. In certain aspects, the processor 1104 has circuitry configured to implement the code stored in the computer-readable medium/memory 1112. The processor 1104 includes circuitry 1122 for grouping one or more UE antennas; circuitry 1124 for sending an indication of the grouping; circuitry 1126 for receiving an indication to group one or more UE antennas; and/or circuitry 1128 for grouping the one or more UE antennas based on the indication.

Figure 12:
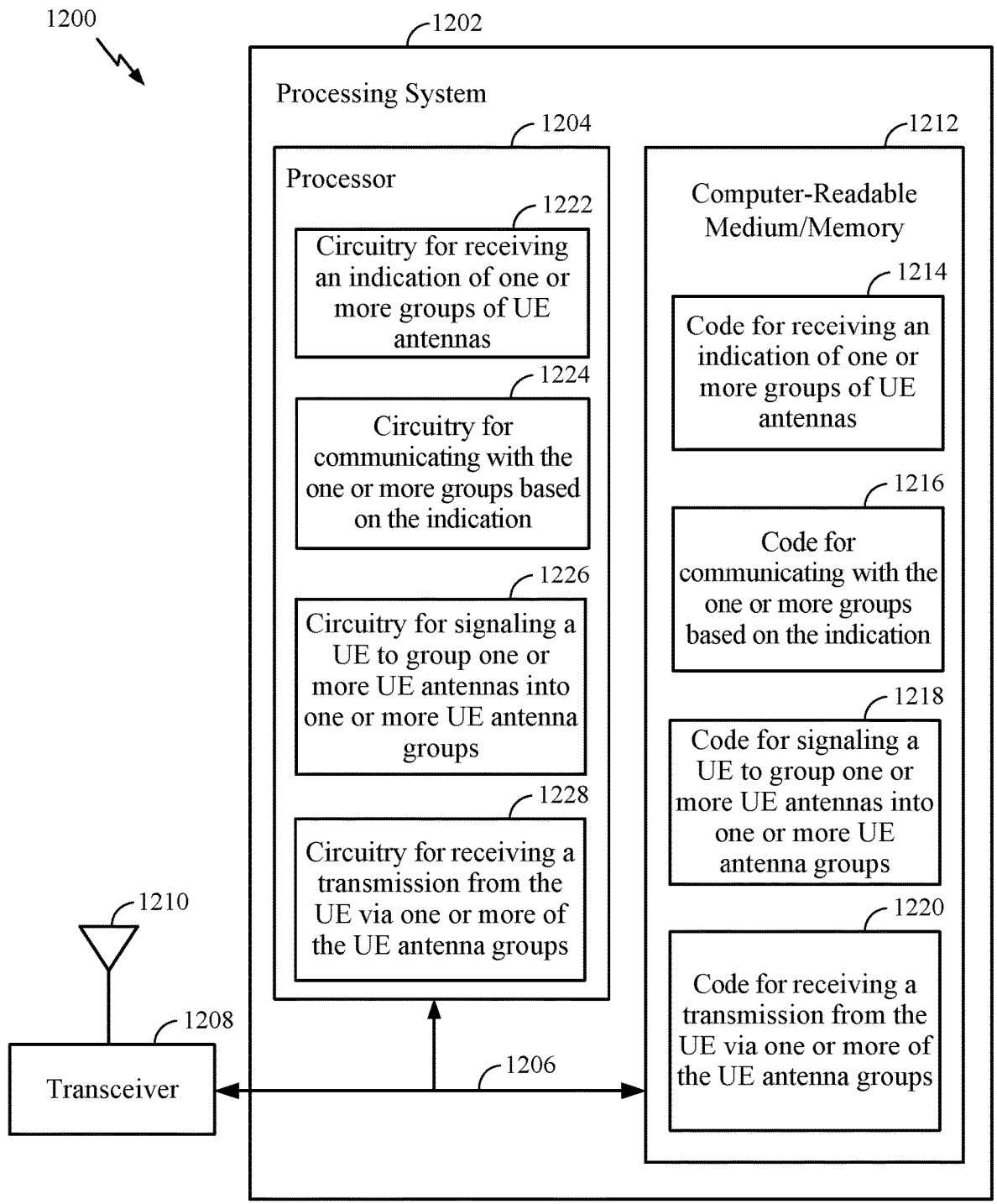
FIG. 12 illustrates another communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 9 and/or FIG. 10. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 9 and/or FIG. 10, or other operations for performing the various techniques discussed herein for UE antenna grouping. In certain aspects, computer-readable medium/memory 1212 stores code 1214 for receiving an indication of one or more groups of UE antennas; code 1216 for communicating with the one or more groups of UE antennas based on the indication; code 1218 for signaling a UE to group one or more UE antennas into one or more UE antenna groups; and/or code 1220 for receiving a transmission form the UE via the one or more of the UE antenna groups. In certain aspects, the processor 1204 has circuitry configured to implement the code stored in the computer-readable medium/memory 1212. The processor 1204 includes circuitry 1222 for receiving an indication of one or more groups of UE antennas; circuitry 1224 for communicating with the one or more groups of UE antennas based on the indication; circuitry 1226 for signaling a UE to group one or more UE antennas into one or more UE antenna groups; and/or circuitry 1228 for receiving a transmission form the UE via the one or more of the UE antenna groups.

Example Aspects

In a first example aspect, a method for wireless communications by a user equipment (UE) includes grouping one or more UE antennas into one or more groups and sending an indication of the one or more groups to a base station (BS).

In a second example aspect, in combination with the first example aspect, the grouping is based on a message from the BS.

In a third example aspect, in combination with one or more of the first or second example aspects, the message indicates the one or more UE antennas to include in the one or more groups.

In a fourth example aspect, in combination with one or more of the first through third example aspects, the message indicates one or more target parameters; and grouping the one or more UE antennas into the one or more groups is based on the one or more target parameters.

In a fifth example aspect, in combination with one or more of the first through fourth example aspects, the one or more target parameters comprise a target rank, a target precoder size, a target beam parameter, a target antenna port, or a combination thereof.

In a sixth example aspect, in combination with one or more of the first through fifth example aspects, the UE receives a request from the BS to provide information regarding the one or more groups, the indication being sent in response to the request.

In a seventh example aspect, in combination with one or more of the first through sixth example aspects, the UE provides information regarding the one or more groups indicating a time at which the UE uses the one or more groups, a duration that the UE uses the one or more groups, or both.

In an eighth example aspect, in combination with one or more of the first through seventh example aspects, the UE provides information regarding UE antennas of the one or more UE antennas having one or more parameters changed by the grouping.

In a ninth example aspect, in combination with one or more of the first through eighth example aspects, the UE provides information to the BS regarding one or more parameters associated with the one or more groups, the one or more parameters including a rank, a precoder size, one or more beam parameters, one or more UE antenna ports, or a combination thereof.

In a tenth example aspect, in combination with one or more of the first through ninth example aspects, the UE receives from the BS, in response to the indication of the one or more groups, a second indication of one or more reference signal parameters for the one or more groups.

In an eleventh example aspect, in combination with one or more of the first through tenth example aspects, the UE sends the BS another indication of a preferred number of UE antenna groups.

In a twelfth example aspect, in combination with one or more of the first through eleventh example aspects, the UE receives a configuration of one or more sounding reference signal (SRS) resource sets, each SRS resource set comprising one or more SRS resources, and each SRS resource set being associated with one of the one or more groups.

In a thirteenth example aspect, in combination with one or more of the first through twelfth example aspects, the UE receives signaling from the BS activating or deactivating one or more of the configured SRS resource sets based on the indication of the one or more groups.

In a fourteenth example aspect, in combination with one or more of the first through thirteenth example aspects, the signaling activates one or more SRS resource sets associated with a plurality of UE antenna groups for a multi-panel physical uplink shared channel (PUSCH) transmission.

In a fifteenth example aspect, in combination with one or more of the first through fourteenth example aspects, at least one of the one or more groups comprises a UE antenna panel.

In a sixteenth example aspect, a method for wireless communications by a user equipment (UE) includes receiving an indication to group one or more UE antennas from a base station (BS) and grouping the one or more UE antennas based on the indication.

In a seventeenth aspect, a method for wireless communications by a base station (BS) includes receiving, from a user equipment (UE), an indication of one or more groups of one or more UE antennas; and communicating with the one or more groups of one or more UE antennas based on the indication.

In an eighteenth example aspect, in combination with the seventeenth example aspect the BS transmits a message to the UE to form the one or more groups, wherein the indication is received in response to the message.

In a nineteenth example aspect, in combination with one or more of the seventeenth or eighteenth example aspects, the message indicates the one or more UE antennas to include in the one or more groups.

In a twentieth example aspect, in combination with one or more of the seventeenth through nineteenth example aspects, the message indicates one or more target parameters and the one or more groups satisfies the one or more target parameters.

In a twenty-first example aspect, in combination with one or more of the seventeenth through twentieth example aspects, the one or more target parameters comprise a target rank, a target precoder size, a target beam parameter, a target antenna port, or a combination thereof.

In a twenty-second example aspect, in combination with one or more of the seventeenth through nineteenth example aspects, the BS transmits a request to the UE to provide information regarding the one or more groups; and determines one or more changed UE parameters based on the information.

In a twenty-third example aspect, in combination with one or more of the seventeenth through twenty-second example aspects, the information regarding the one or more groups indicates a time at which the UE uses the one or more groups, a duration that the UE uses the one or more groups, or both.

In a twenty-fourth example aspect, in combination with one or more of the seventeenth through twenty-third example aspects, the information regarding the one or more groups indicates UE antennas of the one or more UE antennas having one or more parameters changed by the one or more groups.

In a twenty-fifth example aspect, in combination with one or more of the seventeenth through twenty-fourth example aspects, the information regarding the one or more groups indicates one or more parameters associated with each group including a rank, a precoder size, one or more beam parameters, one or more UE antenna ports, or a combination thereof.

In a twenty-sixth example aspect, in combination with one or more of the seventeenth through twenty-third example aspects, the BS transmits to the UE, in response to the indication of the one or more groups, a second indication of one or more reference signal parameters for the one or more groups.

In a twenty-seventh example aspect, in combination with one or more of the seventeenth through twenty-sixth example aspects, the BS receives another indication from the UE of a preferred number of UE antenna groups.

In a twenty-eighth example aspect, in combination with one or more of the seventeenth through twenty-seventh example aspects, the BS configures the UE with one or more sounding reference signal (SRS) resource sets, each SRS resource set comprising one or more SRS resources, and each SRS resource set being associated with one or more UE antenna groups.

In a twenty-ninth example aspect, in combination with one or more of the seventeenth through twenty-eighth example aspects, the at least one of the one or more groups comprises a UE antenna panel.

In a thirtieth aspect, a method for wireless communications by a base station (BS) includes signaling a user equipment (UE) to group one or more UE antennas into one or more UE antenna groups; and receiving a transmission from the UE via one or more of the UE antenna groups.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G NR), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP LTE and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In an LTE or LTE-A network, a set of one or more BSs may define an eNodeB (eNB). In other examples (e.g., in 5G NR), a wireless multiple access communication system may include a number of distributed units (DUs) (e.g., edge units (EUs), edge nodes (ENs), radio heads (RHs), smart radio heads (SRHs), TRPs, etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to BS or DU). In 3GPP, the term "cell" can refer to a coverage area of a Node B (NB) and/or a NB subsystem serving this coverage area, depending on the context in which the term is used. In NR systems, the term "cell" and gNB or gNodeB, BS, access point (AP), or TRP may be interchangeable.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
grouping a plurality of UE antennas into a plurality of groups corresponding to a plurality of UE antenna panels; and
sending a message to a base station (BS) including information indicating the plurality of UE antenna panels and a time at which the UE uses the plurality of UE antenna panels for one or more multi-panel uplink transmissions, a duration that the UE uses the plurality of UE antenna panels for the one or more multi-panel uplink transmissions, or both.

2. The method of claim 1, wherein the grouping is based on a message from the BS.

3. The method of claim 2, wherein the message from the BS indicates the plurality of UE antennas to include in the plurality of groups.

4. The method of claim 2, wherein:
the message from the BS indicates one or more target parameters; and
grouping the plurality of UE antennas into the plurality of groups is based on the one or more target parameters.

5. The method of claim 4, wherein the one or more target parameters comprise a target rank, a target precoder size, a target beam parameter, a target antenna port, or a combination thereof.

6. The method of claim 1, further comprising receiving a request from the BS to provide the information indicating the plurality of groups, wherein the information is sent in response to the request.

7. The method of claim 1, further comprising providing information to the BS regarding UE antennas, of the plurality of UE antennas, having one or more parameters changed by the grouping.

8. The method of claim 1, further comprising providing information to the BS regarding one or more parameters associated with the plurality of groups, the one or more parameters including a rank, a precoder size, one or more beam parameters, one or more UE antenna ports, or a combination thereof.

9. The method of claim 1, further comprising receiving from the BS, in response to the information, an indication of one or more reference signal parameters for the plurality of groups.

10. The method of claim 1, further comprising sending an indication to the BS of a preferred number of UE antenna groups.

11. The method of claim 1, further comprising receiving a configuration from the BS of one or more sounding reference signal (SRS) resource sets, each SRS resource set comprising one or more SRS resources, and each SRS resource set being associated with one of the plurality of groups.

12. The method of claim 11, further comprising receiving signaling from the BS activating or deactivating one or more of the configured SRS resource sets based on the information indicating the plurality of UE antenna panels and the time at which the UE uses the plurality of UE antenna panels for one or more multi-panel uplink transmissions, a duration that the UE uses the plurality of UE antenna panels for the one or more multi-panel uplink transmissions, or both.

13. The method of claim 12, wherein the signaling activates one or more SRS resource sets associated with a plurality of UE antenna groups for a multi-panel physical uplink shared channel (PUSCH) transmission.

14. The method of claim 1, wherein sending the message to the BS comprises sending the message to the BS including information indicating the plurality of UE antenna panels, the time at which the UE uses the plurality of UE antenna panels for the one or more multi-panel uplink transmissions, and the duration that the UE uses the plurality of UE antenna panels for the one or more multi-panel uplink transmissions.

15. The method of claim 1, wherein sending the message to the BS comprises sending the message to the BS including information indicating the plurality of UE antenna panels and a time at which the UE begins use of the plurality of UE antenna panels for the one or more multi-panel uplink transmissions.

16. A method for wireless communications by a user equipment (UE), comprising:
receiving an indication from a base station (BS) to group a plurality of UE antennas;
grouping the plurality of UE antennas, based on the indication, into a plurality of groups corresponding to a plurality of UE antenna panels; and
sending a message to a base station (BS) including information indicating the plurality of UE antenna panels and a time at which the UE uses the plurality of UE antenna panels for one or more multi-panel uplink transmissions, a duration that the UE uses the plurality of UE antenna panels for the one or more multi-panel uplink transmissions, or both.

17. A method for wireless communications by a base station (BS), comprising:
receiving, from a user equipment (UE), a message including information indicating a plurality of groups of a plurality of UE antennas, the plurality of groups corresponding to a plurality of UE antenna panels, and a time at which the UE uses the plurality of UE antenna panels for one or more multi-panel uplink transmissions, a duration that the UE uses the plurality of UE antenna panels for the one or more multi-panel uplink transmissions, or both; and
communicating with the plurality of UE antenna panels based on the indication.

18. The method of claim 17, further comprising transmitting a message to the UE to form the plurality of groups, wherein the information is received in response to the message.

19. The method of claim 18, wherein the message to the UE indicates the plurality of UE antennas to include in the plurality of groups.

20. The method of claim 18, wherein the message to the UE indicates one or more target parameters and the plurality of groups satisfies the one or more target parameters.

21. The method of claim 20, wherein the one or more target parameters comprise a target rank, a target precoder size, a target beam parameter, a target antenna port, or a combination thereof.

22. The method of claim 17, further comprising:
transmitting a request to the UE to provide the information regarding the plurality of groups; and
determining one or more changed UE parameters based on the information.

23. The method of claim 22, wherein the information regarding the plurality of groups indicates UE antennas, of the plurality of UE antennas, having one or more parameters changed by the plurality of groups.

24. The method of claim 22, wherein the information regarding the plurality of groups indicates one or more parameters associated with each group including a rank, a precoder size, one or more beam parameters, one or more UE antenna ports, or a combination thereof.

25. The method of claim 17, further comprising transmitting to the UE, in response to the information, an indication of one or more reference signal parameters for the plurality of groups.

26. The method of claim 17, further comprising receiving an indication from the UE of a preferred number of UE antenna groups.

27. The method of claim 17, further comprising configuring the UE with one or more sounding reference signal (SRS) resource sets, each SRS resource set comprising one or more SRS resources, and each SRS resource set being associated with one or more UE antenna groups.

28. A method for wireless communications by a base station (BS), comprising:
signaling a user equipment (UE) to group a plurality of UE antennas into a plurality of UE antenna groups corresponding to a plurality of UE antenna panels;
receiving, from the UE, a message including information indicating the plurality of UE antenna panels and a time at which the UE uses the plurality of UE antenna panels for one or more multi-panel uplink transmissions, a duration that the UE uses the plurality of UE antenna panels for the one or more multi-panel uplink transmissions, or both; and
receiving a transmission from the UE via one or more of the plurality of UE antenna panels.

29. An apparatus for wireless communication, comprising:
at least one processor; and
a memory coupled to the at least one processor, the memory the at least one processor configured to:
group a plurality of antennas of the apparatus into a plurality of groups corresponding to a plurality of antenna panels; and
send a message to a base station (BS) including information indicating the plurality of antenna panels and a time at which the apparatus uses the plurality of antenna panels for one or more multi-panel uplink transmissions, a duration that the apparatus uses the plurality of antenna panels for the one or more multi-panel uplink transmissions, or both.

30. The apparatus of claim 29, the memory and the at least one processor further configured to send an indication to the BS of a preferred number of antenna groups.

31. The apparatus of claim 29, the memory and the at least one processor further configured to:
receive a configuration from the BS of one or more sounding reference signal (SRS) resource sets, each SRS resource set comprising one or more SRS resources, and each SRS resource set being associated with one of the plurality of groups; and
receive signaling from the BS activating or deactivating one or more of the configured SRS resource sets based on the information indicating the plurality of antenna panels and the time at which the apparatus uses the plurality of antenna panels for one or more multi-panel uplink transmissions, a duration that the apparatus uses the plurality of antenna panels for the one or more multi-panel uplink transmissions, or both.

32. The apparatus of claim 31, wherein the signaling activates one or more SRS resource sets associated with a plurality of antenna groups for a multi-panel physical uplink shared channel (PUSCH) transmission.

33. The apparatus of claim 29, wherein the memory and the at least one processor being configured to send the message to the BS comprises the memory and the at least one processor being configured to send the message to the BS including information indicating the plurality of antenna panels, the time at which the apparatus uses the plurality of antenna panels for the one or more multi-panel uplink transmissions, and the duration that the apparatus uses the plurality of antenna panels for the one or more multi-panel uplink transmissions.

34. The apparatus of claim 29, wherein the memory and the at least one processor being configured to send the message to the BS comprises the memory and the at least one processor being configured to send the message to the BS including information indicating the plurality of antenna panels and a time at which the apparatus begins use of the plurality of antenna panels for the one or more multi-panel uplink transmissions.

35. An apparatus for wireless communication, comprising:
at least one processor; and
a memory coupled to the at least one processor, the memory the at least one processor configured to:
receive an indication from a base station (BS) to group a plurality of antennas;
group the plurality of antennas, based on the indication, into a plurality of groups corresponding to a plurality of antenna panels; and
send a message to a base station (BS) including information indicating the plurality of antenna panels and a time at which the apparatus uses the plurality of antenna panels for one or more multi-panel uplink transmissions, a duration that the apparatus uses the plurality of antenna panels for the one or more multi-panel uplink transmissions, or both.

36. An apparatus for wireless communication, comprising:
at least one processor; and
a memory coupled to the at least one processor, the memory the at least one processor configured to:
receive, from a user equipment (UE), a message including information indicating a plurality of groups of a plurality of UE antennas corresponding to a plurality of UE antenna panels, and a time at which the UE uses the plurality of UE antenna panels for one or more multi-panel uplink transmissions, a duration that the UE uses the plurality of UE antenna panels for the one or more multi-panel uplink transmissions, or both; and
communicate with the plurality of UE antenna panels based on the indication.

37. The apparatus of claim 36, the memory and the at least one processor further configured to:
receive an indication from the UE of a preferred number of UE antenna groups.

38. An apparatus for wireless communication, comprising:
at least one processor; and
a memory coupled to the at least one processor, the memory the at least one processor configured to:
signal a user equipment (UE) to group a plurality of UE antennas into a plurality of UE antenna groups corresponding to a plurality of UE antenna panels;
receive, from the UE, a message including information indicating the plurality of UE antenna panels and a time at which the UE uses the plurality of UE antenna panels for one or more multi-panel uplink transmissions, a duration that the UE uses the plurality of UE antenna panels for the one or more multi-panel uplink transmissions, or both; and
receive a transmission from the UE via one or more of the plurality of UE antenna panels.

39. A computer readable medium storing computer executable code thereon for wireless communications, comprising:
code for grouping a plurality of user equipment (UE) antennas into a plurality of groups corresponding to a plurality of UE antenna panels; and
code for sending a message to a base station (BS) including information indicating the plurality of UE antenna panels and a time at which the UE uses the plurality of UE antenna panels for one or more multi-panel uplink transmissions, a duration that the UE uses the plurality of UE antenna panels for the one or more multi-panel uplink transmissions, or both.

40. The computer readable medium of claim 39, further comprising code for sending an indication to the BS of a preferred number of UE antenna groups.

41. The computer readable medium of claim 39, further comprising:
code for receiving a configuration from the BS of one or more sounding reference signal (SRS) resource sets, each SRS resource set comprising one or more SRS resources, and each SRS resource set being associated with one of the plurality of groups; and
code for receiving signaling from the BS activating or deactivating one or more of the configured SRS resource sets based on the information indicating the plurality of UE antenna panels and the time at which the UE uses the plurality of UE antenna panels for one or more multi-panel uplink transmissions, a duration that the UE uses the plurality of UE antenna panels for the one or more multi-panel uplink transmissions, or both.

42. The computer readable medium of claim 41, wherein the signaling activates one or more SRS resource sets associated with a plurality of UE antenna groups for a multi-panel physical uplink shared channel (PUSCH) transmission.

43. The computer readable medium of claim 39, wherein the code for sending the message to the BS comprises code for sending the message to the BS including information indicating the plurality of UE antenna panels, the time at which the UE uses the plurality of UE antenna panels for the one or more multi-panel uplink transmissions, and the duration that the UE uses the plurality of UE antenna panels for the one or more multi-panel uplink transmissions.

44. The computer readable medium of claim 39, wherein the code for sending the message to the BS comprises code for sending the message to the BS including information indicating the plurality of UE antenna panels and a time at which the UE begins use of the plurality of UE antenna panels for the one or more multi-panel uplink transmissions.

45. A computer readable medium storing computer executable code thereon for wireless communications, comprising:
- code for receiving an indication from a base station (BS) to group a plurality of user equipment (UE) antennas;
- code for grouping the plurality of UE antennas, based on the indication, into a plurality of groups corresponding to a plurality of UE antenna panels; and
- sending a message to a base station (BS) including information indicating the plurality of UE antenna panels and a time at which the UE uses the plurality of UE antenna panels for one or more multi-panel uplink transmissions, a duration that the UE uses the plurality of UE antenna panels for the one or more multi-panel uplink transmissions, or both.

46. A computer readable medium storing computer executable code thereon for wireless communications, comprising:
- code for receiving, from a user equipment (UE), a message including information indicating a plurality of groups of a plurality of UE antennas corresponding to a plurality of UE antenna panels, and a time at which the UE uses the plurality of UE antenna panels for one or more multi-panel uplink transmissions, a duration that the UE uses the plurality of UE antenna panels for the one or more multi-panel uplink transmissions, or both; and
- code for communicating with the plurality of UE antenna panels based on the indication.

47. The computer readable medium of claim 46, further comprising code for receiving an indication from the UE of a preferred number of UE antenna groups.

48. A computer readable medium storing computer executable code thereon for wireless communications, comprising:
- code for signaling a user equipment (UE) to group a plurality of UE antennas into a plurality of UE antenna groups corresponding to a plurality of UE antenna panels;
- code for receiving, from the UE, a message including information indicating the plurality of UE antenna panels and a time at which the UE uses the plurality of UE antenna panels for one or more multi-panel uplink transmissions, a duration that the UE uses the plurality of UE antenna panels for the one or more multi-panel uplink transmissions, or both; and
- code for receiving a transmission from the UE via one or more of the plurality of UE antenna panels.

\* \* \* \* \*